United States Patent
Spencer et al.

(10) Patent No.: US 7,149,950 B2
(45) Date of Patent: Dec. 12, 2006

(54) ASSISTED MEMORY DEVICE FOR READING AND WRITING SINGLE AND MULTIPLE UNITS OF DATA

(75) Inventors: Andrew M. Spencer, Eagle, ID (US); Todd C. Adelmann, Boise, ID (US); Stewart R. Wyatt, Boise, ID (US); Kenneth Kay Smith, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 549 days.

(21) Appl. No.: 10/661,937

(22) Filed: Sep. 12, 2003

(65) Prior Publication Data

US 2005/0060628 A1    Mar. 17, 2005

(51) Int. Cl.
*G11C 29/00* (2006.01)

(52) U.S. Cl. .................. 714/763; 360/26; 360/47; 360/53

(58) Field of Classification Search .......... 714/763, 714/768, 752
See application file for complete search history.

(56) References Cited

U.S. PATENT DOCUMENTS

| 6,076,182 A * | 6/2000 | Jeddeloh ............... 714/763 |
| 6,848,070 B1 * | 1/2005 | Kumar ................. 714/758 |
| 6,961,877 B1 * | 11/2005 | Si et al. ............... 714/49 |

* cited by examiner

*Primary Examiner*—Albert Decady
*Assistant Examiner*—Esaw Abraham

(57) ABSTRACT

A device comprises a memory array in which a plurality of codewords is stored. Each codeword comprises an error correction code and a data block that comprises a plurality of units of data. The device further comprises an error code correction module coupled to the memory array. When multiple units of data are to be read from the device for an address, a codeword stored in a location associated with the address is fetched from the memory array, the error code correction module decodes the codeword and corrects any errors in the data block for that codeword, and the multiple units of data are read from the corrected data block.

20 Claims, 3 Drawing Sheets

ASSISTED MEMORY DEVICE FOR READING AND WRITING SINGLE AND MULTIPLE UNITS OF DATA

TECHNICAL FIELD

The following description relates to memory in general and to assisted memory devices in particular.

BACKGROUND

Magnetic or magnetoresistive random access memory (MRAM) is a type of non-volatile memory. One exemplary application of MRAM is for long-term data storage. A typical MRAM device includes an array of memory cells. Word lines extend along rows of the memory cells, and bit lines extend along columns of the memory cells. Each memory cell is located at a cross point of a word line and a bit line. In one type of MRAM, each memory cell stores a bit of information as an orientation of a magnetization. The magnetization orientation of each memory cell can assume one of two stable orientations at any given time. These two stable orientations of magnetization, parallel and anti-parallel, represent logic values of "1" and "0."

When a unit of data (for example, a byte, word, or other quantity of data) is to be read from a MRAM device, an address associated with a location in the MRAM device is supplied to decoder circuits. The decoder circuits assert appropriate word lines and bit lines to select memory cells associated with that address. Sense amplifiers coupled to the asserted bit lines detect the logic state of the selected memory cells. Typically, in MRAM devices, this process of receiving and decoding an address is performed for each unit of data that is read from the MRAM device.

A similar process is performed for write operations. An address associated with a location in the MRAM device is supplied to decoder circuits. The decoder circuits assert appropriate word lines and bit lines to select memory cells associated with that address. The magnetization orientation of a selected memory cell is changed, if necessary, by supplying current to a word line and a bit line crossing the selected memory cell. The currents create magnetic fields that, when combined, can switch the magnetization orientation of the selected memory cell from parallel to anti-parallel or vice versa.

Some types of dynamic random access memory (DRAM) include a "page mode" for read or write operations. In such a mode, multiple units of data are read from or written to the DRAM for a given address. As used here, a "unit" of data is a multi-bit item of data, including, for example, a byte or word of data. However, for some types of memory (for example, some types of MRAM or other types of emerging memory technology), the incidence of errors that occur during read or write operations can be relatively high. For such memory, reading or writing multiple units of data for a given address can be difficult.

SUMMARY

In one embodiment, a device comprises a memory array in which a plurality of codewords is stored. Each codeword comprises an error correction code and a data block that comprises a plurality of units of data. The device further comprises an error code correction module coupled to the memory array. When multiple units of data are to be read from the device for an address, a codeword stored in a location associated with the address is fetched from the memory array, the error code correction module decodes the codeword and corrects any errors in the data block for that codeword, and the multiple units of data are read from the corrected data block.

In another embodiment, a device comprises a memory array in which a plurality of codewords is stored. Each codeword comprises an error correction code and a data block that comprises a plurality of units of data. The device further comprises an error code correction module coupled to the memory array. When multiple units of data are to be written to the device for an address, the multiple units of data are encoded together to generate a codeword and the generated codeword is written to the memory array in a location associated with the address.

Another embodiment is a method of reading one or more units of data from a memory array in which a plurality of codewords is stored. Each codeword comprises an error correction code and a data block that comprises a plurality of units of data. The method comprises, when multiple units of data are to be read from the memory array for an address, fetching the codeword stored in a location associated with the address from the memory array, decoding the codeword and correcting any errors in the data block for that codeword, and reading the multiple units of data from the corrected data block.

Another embodiment is a method of writing one or more units of data to a memory array in which a plurality of codewords is stored. Each codeword comprises an error correction code and a data block that comprises a plurality of units of data. The method comprises, when multiple units of data are to be written to the memory array for an address, encoding the multiple units of data together to generate a codeword, and writing the generated codeword to the memory array in the location associated with the address.

In another embodiment, a system comprises an assisted memory in which a plurality of codewords is stored. Each codeword comprises an error correction code and a data block that comprises a plurality of units of data. The system further comprises a second device coupled to the assisted memory. When the second device attempts to read multiple units of data from the assisted memory for an address, a codeword stored in a location associated with the address is fetched from the assisted memory, the codeword is decoded, any errors in the data block are corrected for that codeword, and the multiple units of data are read from the corrected data block and supplied to the second device.

In another embodiment, a system comprises an assisted memory in which a plurality of codewords is stored. Each codeword comprises an error correction code and a data block that comprises a plurality of units of data. The system further comprises a second device coupled to the assisted memory. When the second device attempts to write multiple units of data to the assisted memory for an address, the multiple units of data are encoded together to generate a codeword and the generated codeword is written to the assisted memory in a location associated with the address.

In another embodiment, a device comprises a means for receiving an address and a means for fetching a codeword stored at a location associated with the address. The codeword comprises a parity block and a data block that comprises a plurality of units of data. The device further comprises a means for decoding the codeword and correcting any errors in the data block for that codeword, and a means for reading multiple units of data from the corrected data block.

In another embodiment, a device comprises a means for receiving an address, a means for receiving multiple units of data for the address, and a means for encoding the multiple units of data together to generate a codeword. The codeword comprises a data block comprising a plurality of units of data and a parity block generated from the data block. The device further comprises a means for storing the generated codeword at a location associated with the address.

DRAWINGS

Like reference numbers and designations in the various drawings indicate like elements.

DETAILED DESCRIPTION

Figure 1:
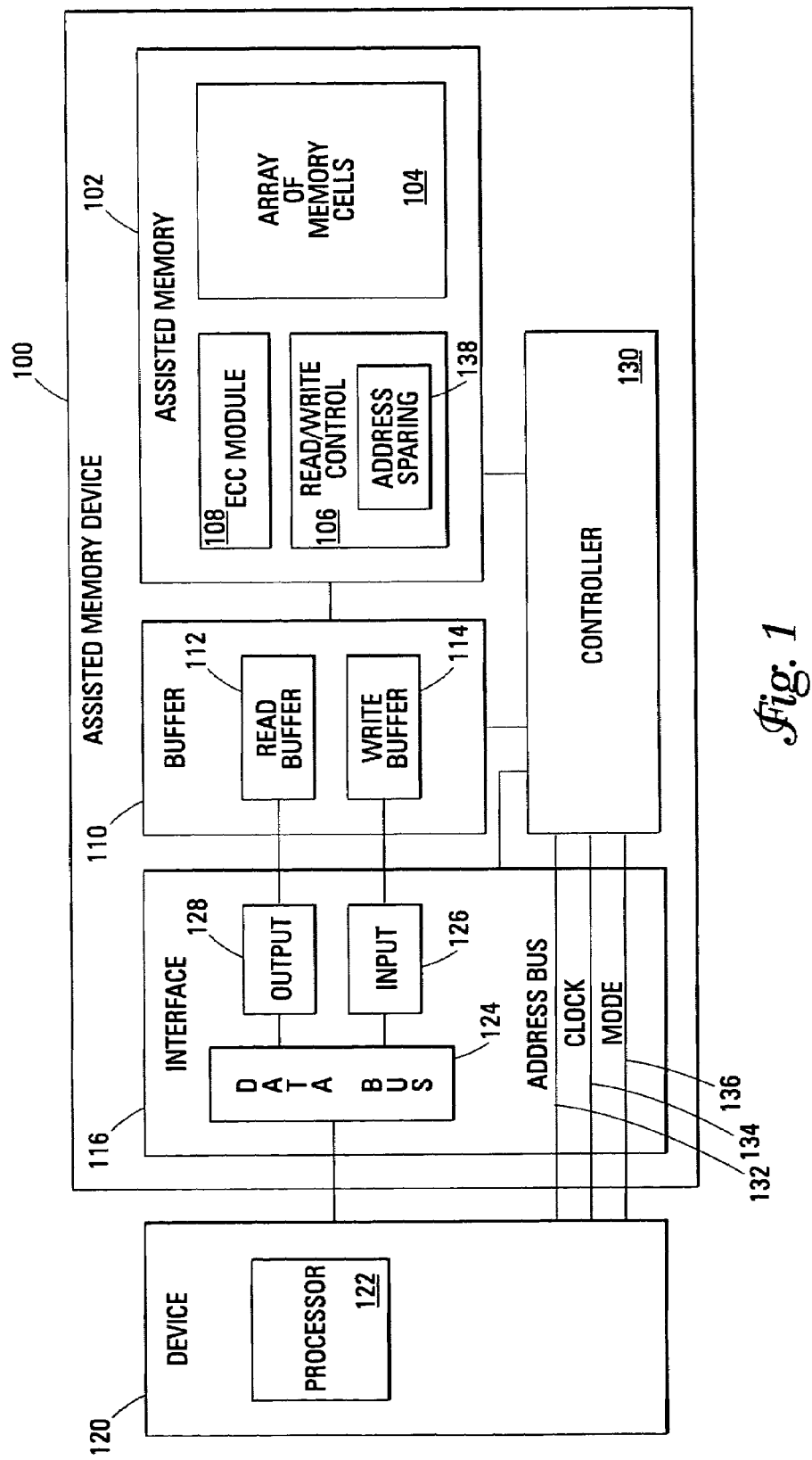
FIG. 1 is a high-level block diagram of one embodiment of an assisted memory device.

FIG. 1 is a high-level block diagram of one embodiment of an assisted memory device 100. Assisted memory device 100 includes an assisted memory 102 in which data is stored and from which data is retrieved. In the embodiment shown in FIG. 1, assisted memory 102 includes an array of memory cells or other memory elements 104, each of which is capable of storing at least one bit of data. In one embodiment, assisted memory 102 includes magnetoresistive or magnetic random access memory (MRAM). In other embodiments, other types of memory are used in the assisted memory device 100.

Assisted memory 102 also includes an error correction code (ECC) module 108. The ECC module 108 is coupled to the array of memory cells 104. The ECC module 108 uses a block code-based error correction code. When data is written to the assisted memory 102, the ECC module 108 "encodes" the fixed block of data by adding parity bits to the block of data (referred to here as an "error correction code" or "parity block"). The result is a "codeword" that includes the original block of data and the parity bits. The codeword is stored in the memory array 104 at a location associated with a supplied address. Examples of error codes include Hamming codes, Reed-Solomon codes, binary Golay codes, binary Goppa codes, or BCH codes. When a unit of data is read from assisted memory 102, a codeword that contains the desired data is fetched from the memory array 104. The ECC module 108 determines if the block of data in the codeword contains any errors, and corrects the errors, if necessary. This operation is also referred to here as "decoding." The result of this decoding operation is referred to here as "a corrected block of data," "corrected data block," or "corrected data." The unit of data is then retrieved from the corrected block of data.

The block of data that ECC module 108 operates on includes multiple units of data (for example, bytes or words) that are transferred between the assisted memory device 100 and an external device 120 (described below). In other words, even if only a single unit of data is to be read from or written to the assisted memory device 100 by an external device 120, an entire codeword containing an entire block of data is processed by the ECC module 108.

In one embodiment, ECC module 108 generates a Reed-Solomon code using 8-bit symbols to encode 128 bytes of data into a codeword. In one implementation of such an embodiment, the ECC module 108 is implemented using a linear feedback shift register (LFSR). Each 8-bit symbol is sequentially passed in order through the LFSR. After all the data symbols have passed through the LFSR, the LFSR continues to be clocked and the parity symbols are output sequentially after the data. To decode a Reed-Solomon codeword, the entire codeword is clocked through a LFSR. After all the symbols of the codeword are processed, partial syndromes are calculated and an error locator polynomial is defined where the roots of the polynomial are the locations of the errors. The error values are calculated from the syndromes and the roots of the error locator polynomial. The Reed-Solomon code is an efficient way to generate codewords; however, in some implementations, the time required to process Reed-Solomon codes is excessive. In another embodiment, ECC module 108 is implemented using combinatorial logic. In one such embodiment, for example where a Reed Solomon code is employed, the size of the unit of data used in the assisted memory device is equal to the size of one symbol used by the ECC module 108 or some integer multiple thereof. By using a unit of data in the assisted memory device 100 having a size equal to the size of one symbol used by the ECC module 108 or some integer multiple thereof, the efficiency of ECC processing can be increased.

In embodiments of assisted memory device 100, memory technology prone to a relatively high incidence of errors (for example, some types of MRAM or other types of emerging memory technology) can be used in the memory array 104. In such embodiments, the ECC module 108 makes the assisted memory device 100 operate, from the perspective of an external device (such as device 120 described below), as a "perfect" or near perfect memory device (that is, a memory device having an acceptably low error rate) even if such an error-prone memory technology is used. In this way, desirable attributes of such error-prone memory technology (for example, speed or density) can be utilized while mitigating the undesirable attributes of such memory technology.

As noted above, ECC module 108, when performing each encoding or decoding operation, operates on a block of data containing multiple units of data. The ECC module 108 operates on a block of data containing multiple units when performing each encoding or decoding operation in order to improve the overall efficiency of the ECC module 108. In one embodiment, a data block size of 32 bytes or 128 bytes is used. In the embodiment shown in FIG. 1, a buffer 110 is coupled to the ECC module 108. The buffer 110 includes a read buffer 112 for storing a corrected block of data read from the assisted memory 102 and decoded by the ECC module 108. In other words, when a particular unit of data is to be read from the assisted memory 102, a codeword containing multiple units of data (including the desired unit of data) is fetched from the memory array 104 and the decoding operation is performed on the entire codeword by the ECC module 108. The results of this decoding operation (that is, the corrected block of data) are stored in a read buffer 112. Then, the desired unit of data is read from the read buffer 112. The buffer 110 also includes a write buffer 114 for storing data to be encoded. In one embodiment, write buffer 114 is implemented as a first-in-first-out (FIFO) buffer.

Buffer 110, including read buffer 112 and write buffer 114, are typically implemented using "perfect" memory (that is, memory having a relatively low incidence of errors) so as to maintain the integrity of the encoding and decoding performed by the ECC module 108. For example, in one embodiment, static random access memory (SRAM) and/or registers are used to implement read buffer 112 and write buffer 114. In other embodiments, read buffer 112 and/or write buffer 114 are implemented in other ways.

In the embodiment shown in FIG. 1, assisted memory 102 also includes read/write control circuitry 106. The read/write control circuitry 106 is used to select one or more of the locations within the array of memory cells 104 for reading or writing. In the embodiment shown in FIG. 1, read/write control circuitry 106 also includes an address sparing circuit 138 that maps the logical address of a block of defective memory cells to a physical address of another block of memory cells during read and write operations.

In one embodiment, this mapping occurs when the number of errors that occurs for a given location exceeds a specified threshold number of errors. In one embodiment, a test is performed (for example, during manufacturing) to identify the locations in the memory array 104 where the errors exceed this threshold number of errors. In one implementation of such an embodiment, a threshold that is lower than the maximum number of errors that can be corrected by the ECC algorithm is used. By using a threshold that is less than this maximum, some of the corrective ability of the ECC algorithm is reserved to detect and correct run-time errors (in addition to those errors detected during manufacturing). For example, in some implementations, there may be "soft errors" that occur at marginal memory locations. On some occasions, a unit of data can be read from or written to such a marginal memory location without an error occurring; on other occasions, an error will occur during a read or write operation with that location. The errors related to such memory locations may be associated with extremes in environmental conditions. Using a threshold that is less than the maximum number of errors that can be corrected by the ECC algorithm reserves a portion of the corrective ability of the ECC algorithm to detect and correct such soft errors.

In one embodiment, read/write control circuitry 106 also includes a row decoder and multiple column decoders and sense amplifiers (all of which are not shown in FIG. 1).

Interface 116 serves as an interface between the buffer 110 and one or more devices 120 in which or with which the assisted memory device 100 is used. The implementation of interface 116 depends on the functionality of the device 120 in which or with which the assisted memory device 100 is used. For example, in the embodiment shown in FIG. 1, the other device 120 includes a processor 122 that is coupled to the assisted memory device 100 using the interface 116. In such an embodiment, interface 116 includes an address bus 132 on which an address associated with a particular location in assisted memory 102 is supplied. The address bus 132 is coupled to a controller 130 (described below).

The interface 116 also includes a data bus 124 over which processor 122 and the assisted memory device 100 transfer data that is written to and read from the assisted memory 102. Interface 116 includes an input circuit 126 that receives data to be written to assisted memory 102 from the data bus 124 (for example, data placed on the data bus 124 by the processor 122) and then causes the received data to be written to the assisted memory 102 as described here. Interface 116 also includes an output circuit 128 that receives data read from the assisted memory 102 and places the data on the data bus 124 (for example, for the processor 122 to retrieve from the data bus 124) as described here. In the embodiment shown in FIG. 1, the address bus 132 and the data bus 124 are shown as separate buses; however, in other embodiments, a single bus is used on which addresses and data are multiplexed.

Interface 116 shown in FIG. 1 also includes a mode input 136 used by the controller 130. Mode input 136 indicates whether a read or write operation is to be performed for a given address supplied to the assisted memory device 100. Mode input 136 also indicates how many units of data are to be read from or written to the assisted memory 102 for a given address supplied to the assisted memory device 100. In one embodiment, the number of units of data indicated on the mode input 136 are read from or written to the assisted memory 102 at consecutive addresses starting with the supplied address. Each unit of data is clocked out or in on successive clock edges or handshakes without requiring the device 120 to address each of the units of data individually thereby boosting performance.

For example, in one embodiment, mode input 136 includes one bit for indicating whether a read or write operation is to be performed (referred to here as the "read/write bit") and three bits for indicating how many units of data are to be read from or written to the assisted memory 102 for a given address. Mode input 136 is implemented, for example, using multiple input lines on which logic signals are applied and/or one or more registers in which mode information is written. Other embodiments include a read/write bit that is separate from the input indicating how many units of data are to be read or written. Moreover, in other embodiments, mode input 136 includes a greater or smaller number of bits for indicating how many units of data are to be read from or written to the assisted memory 102 depending, for example, on the size of the buffer 110 and/or requirements of the device 120 with which the assisted memory 100 is used (for example, the size of the data bus 124).

In the embodiment shown in FIG. 1, the maximum number of units of data that are to be read from or written to the assisted memory 102 for a given address is dependent on the size of the buffer 110. The maximum number of units of data that are to be read from or written to the assisted memory 102, in this embodiment, is the number of units of data that can be stored in the buffer 110 for a read or write operation. In one embodiment, the size of the buffer 110 is the size of the block of data processed by the ECC module 108 during encoding and decoding operations.

The interface 116 also includes a clock input 134. The clock input 134 is used to make the assisted memory device 100 appear, from the perspective of device 120, as a synchronous DRAM (SDRAM) or a double-data rate DRAM (DDR-DRAM). When the assisted memory device 100 is used as such a device, a clock signal is supplied on the clock input 134 to controller 130 in order synchronize data and address transfers between the device 120 and the assisted memory device 100. For example, if the size of data to be transferred over data bus 124 is a multiple of the size of the data bus 124, a segment of data the size of one bus width is clocked in or out (depending on whether a write or read operation is performed) on each clock edge. The assisted memory device 100 can also operate in an asynchronous mode where the device 120 and the assisted memory device 100 are in separate clock domains. In other embodiments, interface 116 is implemented in different ways.

A controller 130 supplies address data to the assisted memory 102 and controls the read and write operations of the assisted memory 102. Controller 130 controls and monitors the operations of the assisted memory 102, the buffer 110, and the interface 116. In one embodiment, controller 130 is implemented as a finite state machine or by programming a microprocessor to execute appropriate program instructions to control the assisted memory device 100.

Figure 2A:
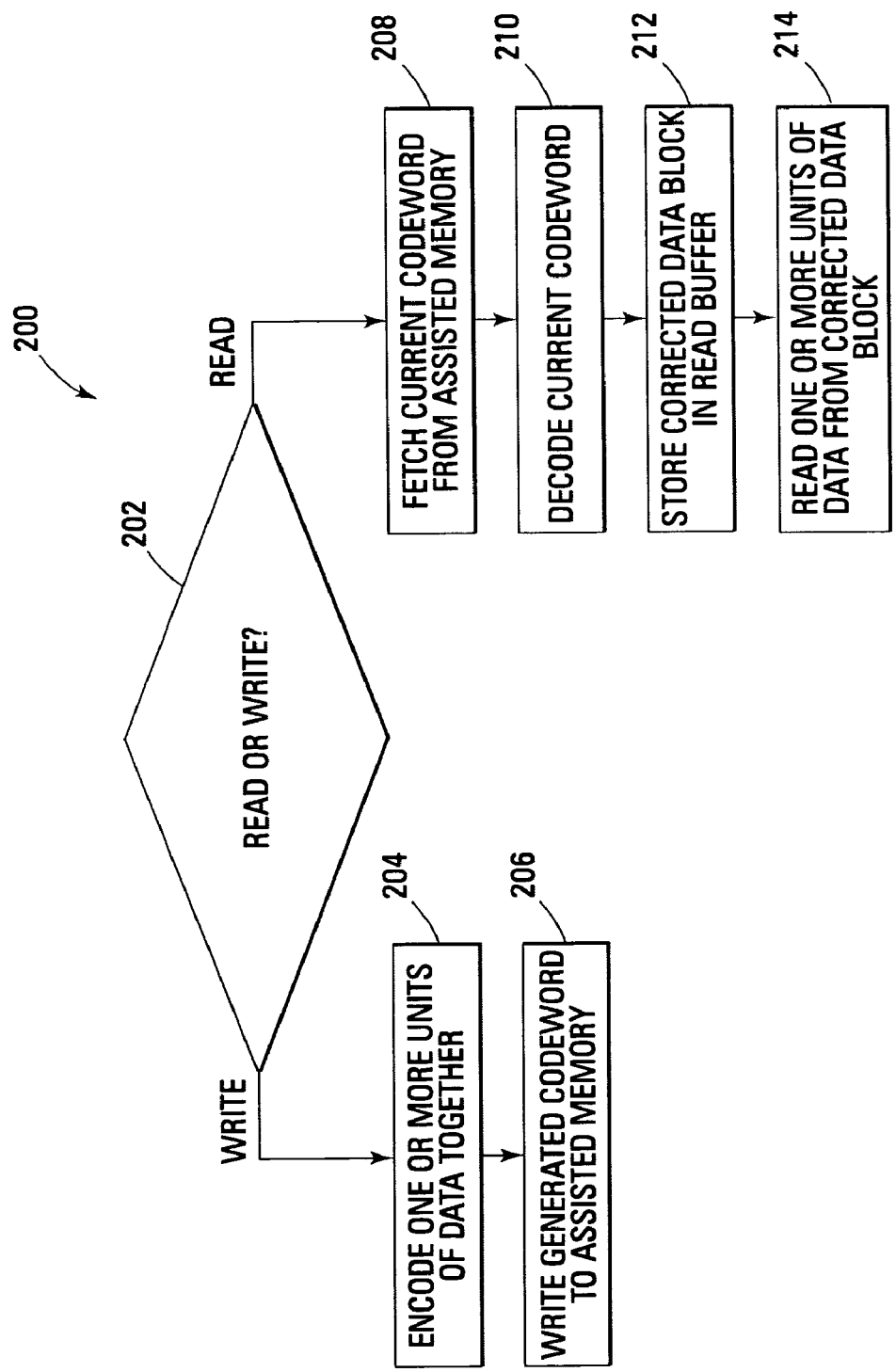
FIG. 2A is a flow diagram of one embodiment of a method of reading data from or writing data to an assisted memory.

FIG. 2A is a flow diagram of one embodiment of a method of reading data from or writing data to an assisted memory device. Embodiments of method 200 are suitable for use with the assisted memory device 100. The embodiment of method 200 shown in FIG. 2A is discussed here as being implemented using assisted memory device 100 of FIG. 1 (though other embodiments of method 200 are implemented using other embodiments of assisted memory). In such an embodiment, the functionality of method 200 is controlled by controller 130. Embodiments of method 200 are suitable for writing one or more units of data that are destined for, or reading one or more units that are included in, the same codeword stored in the assisted memory 102. In one embodiment, multiple units of data are read from or written to the assisted memory 102 at consecutive addresses starting with an address supplied to the assisted memory device 100. In such an embodiment, each unit of data is clocked out or in on successive clock edges or handshakes without requiring the device 120 to address each of the units of data individually thereby boosting performance.

Method 200 includes determining whether a read operation or a write operation is to be performed (checked in block 202). Whether the assisted memory 102 is to be written to or read from is determined by checking a read/write bit. As noted above, when the embodiment of an assisted memory device 100 shown in FIG. 1 is used, the mode input 136 includes a read/write bit. The external device 120 will have asserted or de-asserted the read/write bit to indicate whether a read or write operation is to be performed. As noted above, in one state, the read/write bit indicates that data is to be written from the device 120 to the assisted memory 102 and the other state indicates that data is to be read from the assisted memory 102 and supplied to the device 120. An address associated with a particular location in assisted memory 102 is supplied to the controller 130. In the embodiment shown in FIG. 1, the address is supplied from the device 120 to the controller 130 on the address bus 132.

In the case of a write operation, one or more units of data are encoded together to generate a codeword (block 204). The one or more units of data are retrieved from the data bus 124 and are encoded by the ECC module 108 in a single encoding operation to generate a codeword. The number of units of data to retrieve from the data bus 124 is indicated by the mode input 136. The generated codeword is written to the assisted memory 102 at the location associated with the supplied address (block 206). In this way, when multiple units of data destined for the same codeword are written to the assisted memory 102, only one encoding operation and one write operation need be performed to write multiple units of data to the assisted memory 102.

Figure 2B:
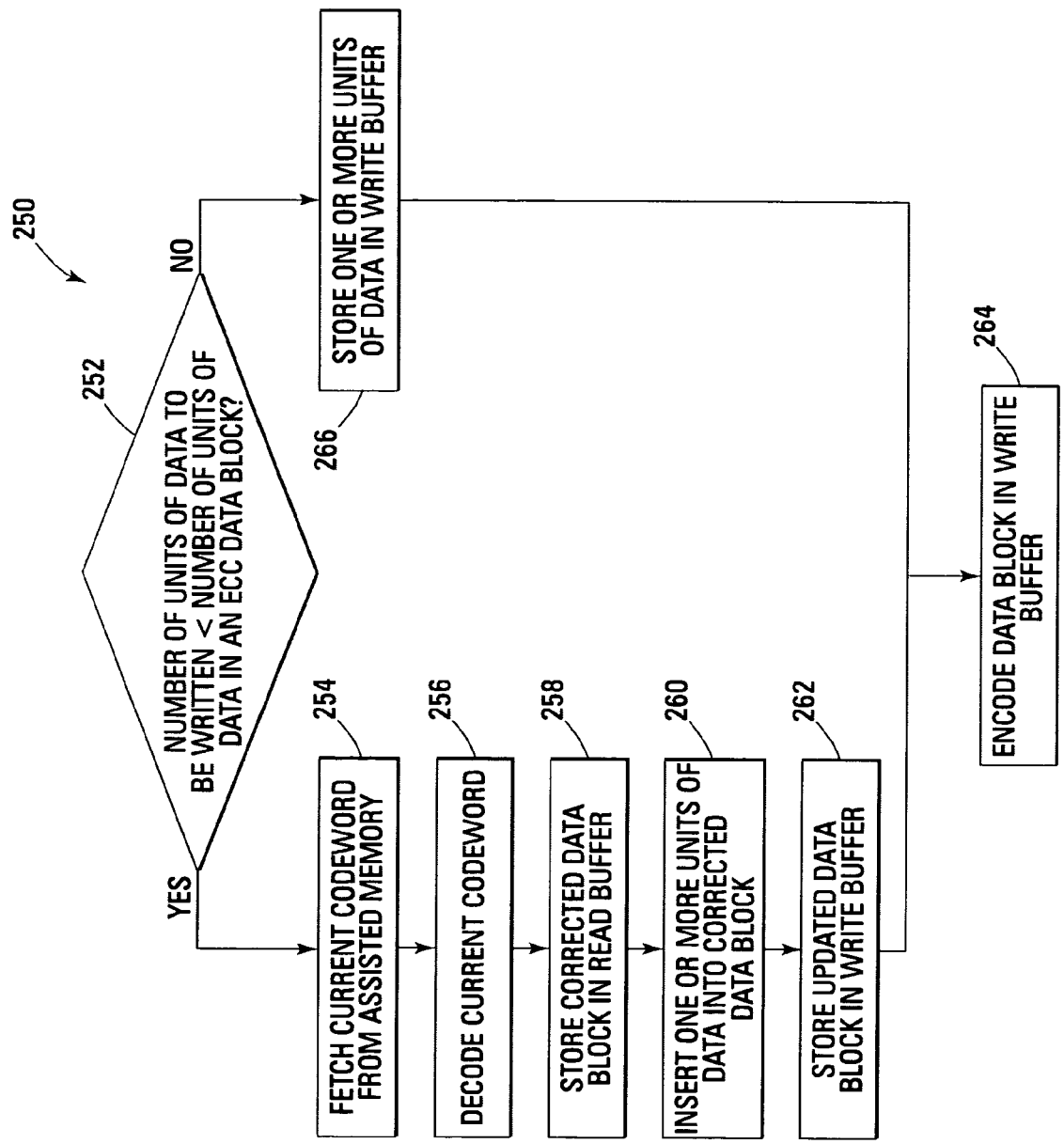
FIG. 2B is a flow diagram of one embodiment of a method of encoding one or more units of data together to generate a codeword.

FIG. 2B is a flow diagram of one embodiment of a method 250 of encoding one or more units of data together to generate a codeword. Embodiments of method 250 are suitable for use in embodiments of method 200 (specifically, to implement block 204). If the number of units of data to be written to the assisted memory 102 is less than the number of units of data in a data block that the ECC module 108 operates on (checked in block 252), the codeword stored at the location in the assisted memory 102 associated with the supplied address is fetched from the assisted memory 102 (block 254). The number of units of data to be written to the assisted memory device 100 is indicated by the mode input 136. The corrected data block is decoded from the codeword (block 256) and the resulting corrected data block is stored in the read buffer 112 (block 258). The controller 130 then inserts one or more units of data from the data bus 124 into the corrected data block at a location or locations associated with the supplied address (block 260). The units of data that are inserted in the current data block overwrite appropriate portions of the current data block.

The updated data block is stored in the write buffer 114 (block 262). Then, the ECC module 108 generates a new codeword from the updated data block stored in the write buffer 114 (block 264). At this point, the generated codeword is written to the assisted memory 102 at the location associated with the supplied address (for example, as shown in block 206 of FIG. 2A). In other words, the previously fetched codeword is overwritten in the assisted memory 102 by the generated codeword. In one embodiment, a codeword is fetched and decoded and the resulting current data block is stored in the read buffer 112 while data is being retrieved from the data bus 124 and stored in the write buffer 114. When multiple units of data destined for the same codeword are to be written to the assisted memory device 102, the codeword currently stored in the location associated with the supplied address does not need to be fetched from the assisted memory 102 and decoded separately for each of the multiple units of data. Instead, the codeword is fetched once, which improves the operational efficiency of the assisted memory device 100.

In another embodiment, when the amount of new data in the updated data block is a small fraction of the total codeword, only the new units of data in the updated data block (that is, those units of data that are different from the corresponding unit of data currently stored in the assisted memory 102) are written to the assisted memory 102. The entire updated data block (which includes both new data and unchanged data) is used to generate the updated parity bits, which are written to the assisted memory 102. Such an approach can, in some instances, reduce the amount of writing that is required for such a write operation.

If the number of units of data to be written is equal to the number of units of data in a data block that the ECC module 108 operates on, the codeword for the supplied address need not be fetched from the assisted memory 102 and decoded. Instead, the controller 130 stores one or more units data from the data bus 124 in the write buffer 114 (block 266). Then, the ECC module 108 generates a new codeword from the resulting data block stored in the write buffer 114 (block 264). At this point, the generated codeword is written to the assisted memory 102 at the location associated with the supplied address (for example, as shown in block 206 of FIG. 2A). As a result, when the amount of data to be written is equal to the size of the data block that the ECC module 108 operates on, the codeword for the supplied address need not be fetched from assisted memory 102 and decoded. This improves the operational efficiency of the assisted memory device 100 when performing such multi-unit operations.

When the embodiment of method 200 shown in FIG. 2A determines that a read operation is to be performed, the codeword stored at the location in the assisted memory 102 associated with the supplied address is fetched from the assisted memory 102 (block 208 shown). The codeword is decoded and corrected by the ECC module 108 (block 210) and the resulting corrected data block is stored in the read buffer 112 (block 212). Then, the number of units of data indicated by the mode input 136 is read from the corrected data block stored in the read buffer 112 (block 214). In other words, if the mode input 136 indicates that a single unit of data is to be read, then the single unit of data is read from the corrected data block stored in the read buffer 112. If the mode input 136 indicates that more than one unit of data is to be read, then multiple units of data are read from the corrected data block stored in the read buffer 112. With such an approach, when multiple units of data from the same codeword are to be read, only one fetch operation and one decode operation need be performed. These operations need not be repeated for each for unit of data that is to be read, which improves the operational efficiency of the assisted memory device 100 when performing such multi-unit operations.

In embodiments where a clock signal is used (for example, where the assisted memory device 100 is to appear as a SDRAM or DDR-DRAM to device 120), a clock signal (received on clock input 134) is used to clock in the address from the address bus 132, to clock in the units of data from the read buffer 112 to the data bus 124, and to clock in the one or more units of data from the data bus 124 to the write buffer 114.

In other embodiments of method 200, such multi-unit operations are supported only for read operations or only for write operations. In other embodiments, such multi-unit operations are supported for read operation and for write operations. Moreover, in other embodiments, one or more of the acts of method 200 occur in a different order or in parallel.

For example, another embodiment is implemented so as to support multi-unit operations that read or write multiple units of data from two or more contiguous codewords in an assisted memory. For example, when multiple units of data that span two codewords are to be read from an assisted memory, the first codeword is fetched and decoded, the corrected data block is stored in the buffer, and a subset of the multiple units of data are read from the first stored data block. Then, the second codeword is fetched and decoded, the corrected data block is stored in the buffer, and the remaining units of data are read from the stored second data block. A similar technique is used for multi-unit write operations that span multiple codewords.

Various embodiments of the invention have been described. Nevertheless, it will be understood that various modifications to the described embodiments may be made without departing from the spirit and scope of the claimed invention. Accordingly, other embodiments are within the scope of the following claims.

What is claimed is:

1. A device, comprising:
   a memory array in which a plurality of codewords is stored, each codeword comprising an error correction code and a data block comprising a plurality of units of data; and
   an error code correction module coupled to the memory array;
   wherein when multiple units of data are to be read from the device for an address, a codeword stored in a location associated with the address is fetched from the memory array, the error code correction module decodes the codeword and corrects any errors in the data block for that codeword, and the multiple units of data are read from the corrected data block;
   wherein when a single unit of data is to be read from the device for the address, the codeword stored in a location associated with the address is fetched from the memory array, the error code correction module decodes the codeword and corrects any errors in the data block for that codeword, and the single unit of data to be read for the address is read from the corrected data block.

2. The device of claim 1, further comprising a buffer coupled to the memory array, wherein the corrected data block is stored in the buffer and the multiple units of data are read from the buffer.

3. The device of claim 2, wherein the buffer comprises a read buffer.

4. The device of claim 2, wherein the buffer comprises a write buffer.

5. The device of claim 1, further comprising a mode input that indicates how many units of data are to be read from the device for the address.

6. The device of claim 5, wherein the mode input comprises a read/write bit that indicates whether one or more units of data are to be read from or written to the device for the address.

7. A device, comprising:
   a memory array in which a plurality of codewords is stored, each codeword comprising an error correction code and a data block comprising a plurality of units of data; and
   an error code correction module coupled to the memory array;
   wherein when multiple units of data are to be written to the device for an address, the multiple units of data are encoded together to generate a codeword and the generated codeword is written to the memory array in a location associated with the address;
   wherein when a single unit of data is to be written to the device for the address, a codeword associated with the address is fetched from the memory array, the error code correction module decodes the codeword and corrects any errors in the data block for that codeword, the single unit is inserted into the corrected data block, the corrected data block is encoded to generate the generated codeword, and the generated codeword is written to the memory array in a location associated with the address.

8. The device of claim 7, wherein the multiple units of data to be written to the device for the address includes a first number of units of data to be written and each codeword includes a second number of units of data; and
   wherein when the multiple units of data are to be written to the device for the address and the first number is less than the second number, a codeword associated with the address is fetched from the memory array, the error code correction module decodes the codeword and corrects any errors in the data block for that codeword, the multiple units of data are inserted into the corrected data block, the corrected data block is encoded to generate the generated codeword, and the generated codeword is written to the memory array in a location associated with the address.

9. The device of claim 7, wherein the multiple units of data are written to the memory array at consecutive addresses starting with the address.

10. The device of claim 7, wherein the memory array includes a magnetic random access memory.

11. The device of claim 7, further comprising a controller that controls the operation of the device.

12. The device of claim 7, wherein the device further includes an address sparing circuit that maps a logical address to a physical address in the memory array.

13. The device of claim 7, wherein each unit of data is equal in size to one or more symbols used by the error code correction module.

14. A method of reading one or more units of data from a memory array in which a plurality of codewords is stored, each codeword comprising an error correction code and a data block comprising a plurality of units of data, the method comprising:
- when multiple units of data are to be read from the memory array for an address:
  - fetching the codeword stored in a location associated with the address from the memory array;
  - decoding the codeword and correcting any errors in the data block for that codeword; and
  - reading the multiple units of data from the corrected data block; and
- when a single unit of data is to be read from the memory array for the address:
  - fetching the codeword stored in the location associated with the address from the memory array;
  - decoding the codeword and correcting any errors in the data block for that codeword;
  - reading the single unit of data to be read for the address from the corrected data block.

15. The method of claim 14, further comprising determining if a read operation or a write operation is to be performed for the address.

16. The method of claim 15, further comprising:
- when multiple units of data are to be written to the memory array for the address:
  - encoding the multiple units of data together to generate a codeword; and
  - writing the generated codeword in the memory array in the location associated with the address.

17. The method of claim 16, wherein the multiple units of data to be written to the memory array for the address includes a first number of units of data to be written and each codeword includes a second number of units of data; and
- further comprising, when the multiple units of data are to be written to the memory array for the address and the first number is less than the second number:
  - fetching the codeword stored in the location associated with the address from the memory array;
  - decoding the codeword and correcting any errors in the data block for that codeword;
  - inserting the multiple units of data into the corrected data block;
  - encoding the corrected data block to generate the generated codeword; and
  - writing the generated codeword to the memory array in a location associated with the address.

18. The method of claim 16, further comprising:
- when a single unit of data is to be written to the memory array for the address:
  - fetching the codeword stored in the location associated with the address from the memory array;
  - decoding the codeword and correcting any errors in the data block for that codeword;
  - inserting the single unit of data into the corrected data block;
  - encoding the corrected data block to generate the generated codeword; and
  - writing the generated codeword to the memory array in a location associated with the address.

19. A method of writing one or more units of data to a memory array in which a plurality of codewords is stored, each codeword comprising an error correction code and a data block comprising a plurality of units of data, the method comprising:
- when multiple units of data are to be written to the memory array for an address:
  - encoding the multiple units of data together to generate a codeword; and
  - writing the generated codeword to the memory array in the location associated with the address; and
- when a single unit of data is to be written to the memory array for the address:
  - fetching the codeword stored in the location associated with the address from the memory array;
  - decoding the codeword and correcting any errors in the data block for that codeword;
  - inserting the single unit of data into the corrected data block;
  - encoding the corrected data block to generate the generated codeword; and
  - writing the generated codeword to the memory array in the location associated with the address.

20. The method of claim 19, wherein the multiple units of data to be written to the memory array for the address includes a first number of units of data to be written and each codeword includes a second number of units of data; and
- further comprising, when the multiple units of data are to written to the memory array and the first number is less than the second number:
  - fetching the codeword stored in the location associated with the address from the memory array;
  - decoding the codeword and correcting any errors in the data block for that codeword;
  - inserting the multiple units of data into the corrected data block;
  - encoding the corrected data block to generate the generated codeword; and
  - writing the generated codeword to the memory array in the location associated with the address.

* * * * *